US012631483B2

(12) United States Patent
Mori et al.

(10) Patent No.: US 12,631,483 B2
(45) Date of Patent: May 19, 2026

(54) SENSOR AND SENSOR PROCESSING DEVICE

(71) Applicant: Murata Manufacturing Co., Ltd., Nagaokakyo (JP)

(72) Inventors: Kenichi Mori, Nagaokakyo (JP); Toru Tominaga, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 584 days.

(21) Appl. No.: 18/068,793

(22) Filed: Dec. 20, 2022

(65) Prior Publication Data

US 2023/0123365 A1 Apr. 20, 2023

Related U.S. Application Data

(63) Continuation of application No. PCT/JP2022/016232, filed on Mar. 30, 2022.

(30) Foreign Application Priority Data

Jun. 17, 2021 (JP) ................................. 2021-100589

(51) Int. Cl.
*G01H 11/08* (2006.01)
*G01B 7/16* (2006.01)
(Continued)

(52) U.S. Cl.
CPC ............... *G01H 11/08* (2013.01); *G01B 7/18* (2013.01); *G01B 7/16* (2013.01); *G01D 5/14* (2013.01); *G01L 1/16* (2013.01); *G01N 29/14* (2013.01)

(58) Field of Classification Search
CPC . G01H 11/08; G01B 7/18; G01B 7/16; G01D 5/14; G01L 1/16; G01N 29/14
(Continued)

(56) References Cited

U.S. PATENT DOCUMENTS

| | | | | | |
|---|---|---|---|---|---|
| 4,672,839 A | * | 6/1987 | Takeuchi | .............. | G01L 23/222 |
| | | | | | 73/35.11 |
| 5,347,870 A | * | 9/1994 | Dosch | ...................... | G01B 7/00 |
| | | | | | 310/319 |

(Continued)

FOREIGN PATENT DOCUMENTS

| | | |
|---|---|---|
| JP | S57144023 U | 9/1982 |
| JP | S6329203 A | 2/1988 |

(Continued)

OTHER PUBLICATIONS

International Search Report in PCT/JP2022/016232, mailed on Jun. 21, 2022, 3 pages.

*Primary Examiner* — Peter J Macchiarolo
*Assistant Examiner* — John M Royston
(74) *Attorney, Agent, or Firm* — ArentFox Schiff LLP

(57) ABSTRACT

A sensor is provided that includes a piezoelectric body; an electric resistor disposed on a first principal surface of the piezoelectric body; a vibration detection electrode disposed on a second principal surface of the piezoelectric body; a resistance voltage dividing circuit that has a first input terminal and a voltage dividing point; and a feedback processing circuit that has a second input terminal. Moreover, the electric resistor is connected to the voltage dividing point and the first input terminal, and the vibration detection electrode is connected to the second input terminal.

20 Claims, 5 Drawing Sheets

(51) Int. Cl.
  *G01D 5/14*        (2006.01)
  *G01L 1/16*        (2006.01)
  *G01N 29/14*       (2006.01)

(58) Field of Classification Search
  USPC ........................................................... 73/654
  See application file for complete search history.

(56)                    References Cited

U.S. PATENT DOCUMENTS

2002/0170356  A1*  11/2002  Yamashita  ............  G01P 15/097
                                                          73/504.12
2019/0141455  A1*   5/2019  Ishibashi  ..............  H10N 30/302
2020/0109995  A1     4/2020  Kitada

FOREIGN PATENT DOCUMENTS

JP            S646831  A     1/1989
JP         2002022560  A     1/2002
JP         2007170942  A     7/2007
JP         2019087886  A     6/2019
WO         2019021981  A1    1/2019

* cited by examiner

FIG. 3

SENSOR AND SENSOR PROCESSING DEVICE

CROSS REFERENCE TO RELATED APPLICATIONS

This application is a continuation of PCT Application No. PCT/JP2022/016232, filed Mar. 30, 2022, which claims priority to Japanese Patent Application No. 2021-100589, filed Jun. 17, 2021, the entire contents of each of which are hereby incorporated by reference in their entirety.

TECHNICAL FIELD

The present invention relates to a sensor for detecting static strain and minute vibrations.

BACKGROUND

A sensor is described in Japanese Patent Application No. 2007-170942 (hereinafter "Patent Document 1") in which an electric resistor is formed on a surface of a polymeric piezoelectric body. The sensor of Patent Document 1 measures elastic waves (e.g., minute vibrations) with the polymeric piezoelectric body. Further, the sensor of Patent Document 1 measures static strain based on a resistance change of the electric resistor.

The sensor of Patent Document 1 measures static strain based on a change in a time constant by the resistance of the electric resistor and the capacitance of the piezoelectric body. Therefore, the sensor of Patent Document 1 requires a timer and a pulse waveform for charging, and thus requires a complex circuit to operate.

SUMMARY OF THE INVENTION

Therefore, it is an object of an exemplary embodiment of the present invention to provide a sensor configured to detect both static strain and minute vibrations with a simple configuration.

In an exemplary aspect, a sensor is provided that includes a piezoelectric body; an electric resistor that is disposed on a first principal surface of the piezoelectric body; a vibration detection electrode that is disposed on a second principal surface of the piezoelectric body; a resistance voltage dividing circuit that has a first input terminal and a voltage dividing point; and a feedback processing circuit that has a second input terminal. Moreover, the electric resistor is connected to the voltage dividing point and the first input terminal, and the vibration detection electrode is connected to the second input terminal.

In operation, when strain occurs in the piezoelectric body, the resistance of the electric resistor changes. When the resistance of the electric resistor changes, the output voltage of the resistance voltage dividing circuit also changes. Therefore, the sensor is configured to detect static strain. In addition, the sensor can be configured to detect minute vibrations at a high level by converting electric charge generated when vibrations occur in the piezoelectric body into voltage using the feedback processing circuit having a large input impedance.

According to an exemplary embodiment of the present invention, both static strain and minute vibrations can be detected with a simple configuration.

BRIEF DESCRIPTION OF DRAWINGS

FIG. 3 is a circuit diagram showing a configuration of a feedback processing circuit 91.

DETAILED DESCRIPTION

Figure 1:
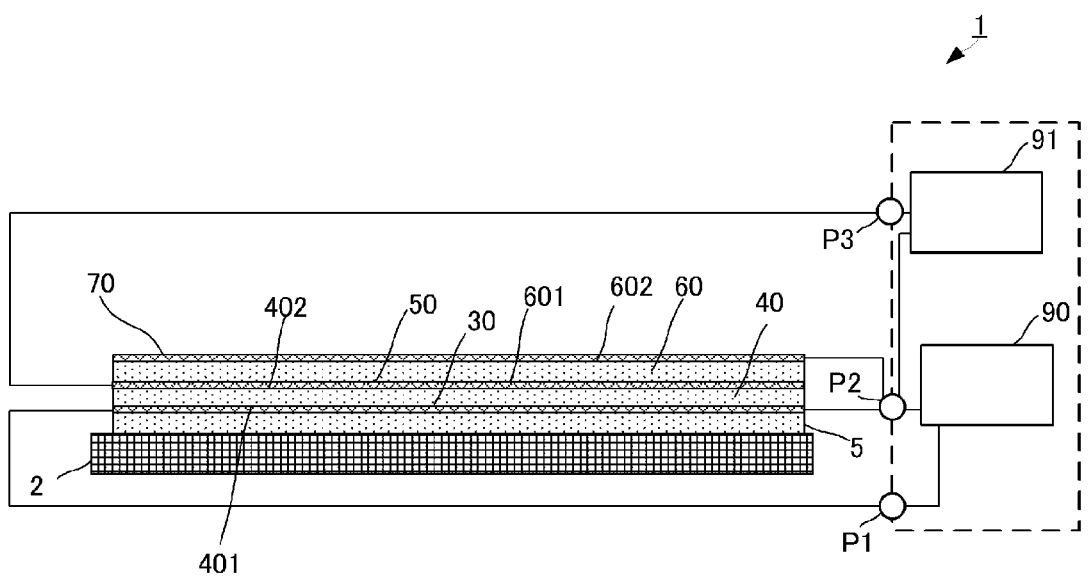
FIG. 1 is a side sectional view of a sensor 1.

Hereinafter, a sensor of an exemplary embodiment of the present invention will be described with reference to the drawings. FIG. 1 is a side sectional view of a sensor 1 in this exemplary aspect. In operation, the sensor can be configured to be attached to, for example, human skin to detect pulsation, which are minute vibrations, and static strain. The sensor 1 is attached to a detection target 2, such as human skin, with an adhesive 5.

As shown, the sensor 1 includes a piezoelectric body 40, an electric resistor 30 disposed on a first principal surface 401 of the piezoelectric body 40, and a vibration detection electrode 50 disposed on a second principal surface 402 of the piezoelectric body 40 that opposes the first principal surface 401. The sensor 1 further includes an insulating body 60 and a shield electrode 70 disposed to face the second principal surface 402 of the piezoelectric body 40. The insulating body 60 includes a third principal surface 601 and a fourth principal surface 602, and the third principal surface 601 is disposed to directly face the second principal surface 402 of the piezoelectric body 40. The shield electrode 70 is disposed on the fourth principal surface 602 of the insulating body 60. However, it is noted that the insulating body 60 and the shield electrode 70 can be omitted in other exemplary embodiments of the present invention.

The piezoelectric body 40 is made of, for example, a ceramic or polymer-based piezoelectric material. The polymer piezoelectric material includes, for example, polyvinylidene fluoride (PVDF), uniaxially stretched polylactic acid, or the like. The piezoelectric constant of the uniaxially stretched polylactic acid belongs to a very high class among polymers. That is, it is possible to detect minute vibrations and static strain with high sensitivity. In addition, since polylactic acid does not have pyroelectricity, when heat is transmitted to human skin or the like, the amount of generated charge does not change. Thus, polylactic acid is suitable for a sensor to be attached to human skin or the like. Furthermore, the piezoelectric constant of polylactic acid does not fluctuate over time and is extremely stable.

The insulating body 60 is made of, for example, polyethylene terephthalate (PET), polymethyl methacrylate resin (PMMA), or the like.

Each of the electric resistor 30, the vibration detection electrode 50, and the shield electrode 70 can be made of a metal thin film, such as a copper-nickel alloy or a nickel-chromium alloy.

The vibration detection electrode 50 is a solid electrode covering substantially the entire surface of the second principal surface 402 of the piezoelectric body 40. The shield electrode 70 is a solid electrode having substantially the same area as the vibration detection electrode 50 in a plan view, and covers substantially the entire surface of the vibration detection electrode 50 with the insulating body 60 interposed therebetween. Moreover, the electric resistor 30 can be patterned in a meander shape in a plan view, for example.

The electric resistor 30 is connected to a resistance voltage dividing circuit 90 via a wire. One end of the wire is connected to the resistance voltage dividing circuit 90 via a connection point P1, and the other end of the wire is connected to the resistance voltage dividing circuit 90 via a connection point P2. The shield electrode 70 is connected to the connection point P2. Moreover, the vibration detection electrode 50 is connected to a feedback processing circuit 91 via a wire and a connection point P3. The feedback processing circuit 91 is connected to the shield electrode 70 and the electric resistor 30 via the connection point P2.

Figure 2:
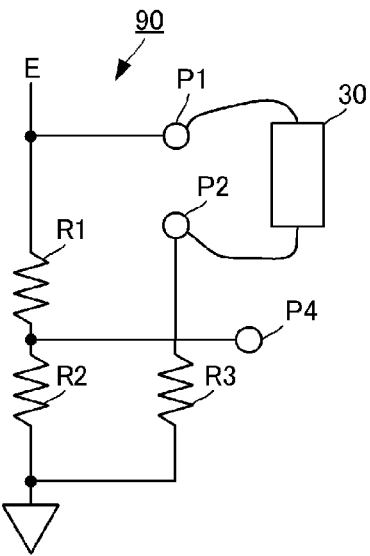
FIG. 2 is a circuit diagram showing a configuration of a resistance voltage dividing circuit 90.
Figure 3:
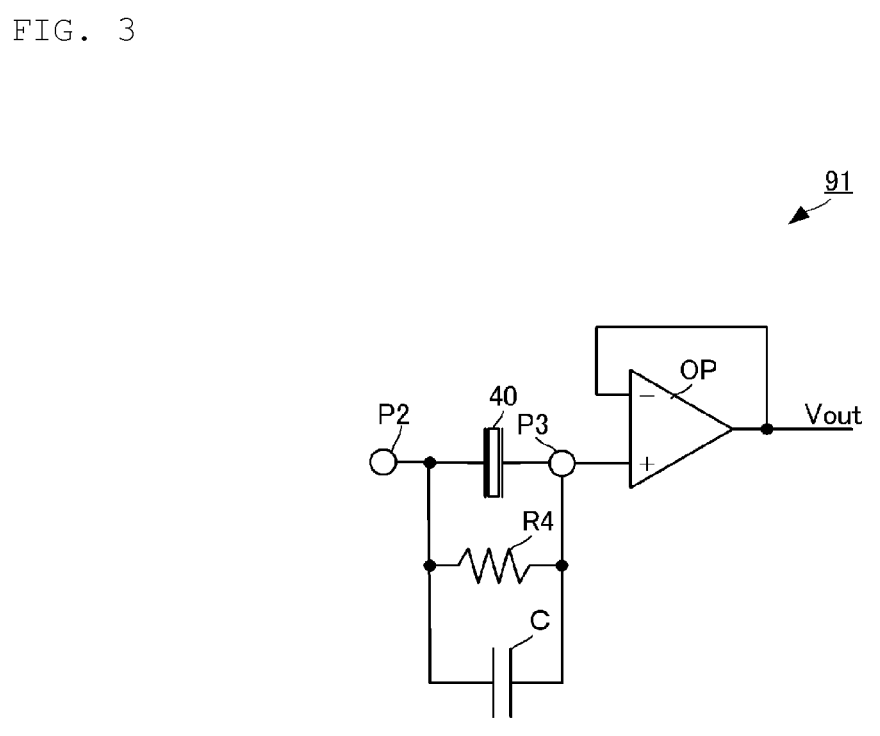

FIG. 2 is a circuit diagram showing a configuration of the resistance voltage dividing circuit 90. FIG. 3 is a circuit diagram showing a configuration of the feedback processing circuit 91.

In particular, the resistance voltage dividing circuit 90 shown in FIG. 2 includes a resistor R1, a resistor R2, and a resistor R3. The connection point P1 corresponds to an input point (e.g., a first input terminal) of the resistance voltage dividing circuit 90. The connection point P2 corresponds to a voltage dividing point (e.g., a voltage dividing point of the resistor R3 and the electric resistor 30) of the resistance voltage dividing circuit 90. The resistor R1, the resistor R2, the resistor R3, and the electric resistor 30 form a bridge circuit in the exemplary aspect.

Moreover, a power supply voltage (e.g., a bridge voltage) E is applied to the connection point P1 which is the first input terminal. Then, the resistance voltage dividing circuit 90 outputs an output voltage e that is a potential difference between the connection point P2, which is a voltage dividing point, and a voltage dividing point (e.g., a connection point) P4 of the resistor R1 and the resistor R2.

Here, when the detection target 2 is deformed and the piezoelectric body 40 is distorted, the shape of the electric resistor 30, which is patterned in a meander shape, is changed, and thus the resistance value of the electric resistor 30 is changed. When the resistance value of the electric resistor 30 changes, the output voltage e also changes. For example, when the resistance values of the resistor R1, the resistor R2, the resistor R3, and the electric resistor 30 are all R and the change in the resistance value of the electric resistor 30 is $\Delta R$, the output voltage e is expressed by $e=(\frac{1}{4})\cdot(\Delta R/R)\cdot E$.

Thus, the sensor 1 is configured to measure the change in the resistance value of the electric resistor 30 by measuring the output voltage e. The sensor 1 can also be configured to obtain a strain by dividing the change in the resistance value by a gauge factor (e.g., a value determined by the material of the electric resistor 30).

It is noted that the sensor 1 can also measure a minute output voltage e with higher accuracy by connecting the connection point P2 and the connection point P4 to a differential amplifier circuit (not shown) to amplify the potential difference.

Next, the feedback processing circuit 91 shown in FIG. 3 includes an operational amplifier OP. The operational amplifier OP is connected to a circuit including the piezoelectric body 40, a resistor R4, and a capacitor C, which are connected in parallel. The operational amplifier OP forms a voltage follower whose output is connected to an inverting input terminal. The resistance value of the resistor R4 and the capacitance of the capacitor C are adjusted in accordance with a time constant for detecting the output voltage of the piezoelectric body 40 caused by minute vibrations of about several hundred milliseconds, for example.

As described above, the connection point P2 is connected to the shield electrode 70 and the electric resistor 30 and is thus set to a reference potential. When the electric resistor 30 is set to the reference potential, the electric resistor 30 is also configured to function as a shield electrode 70 by being electrically connected to the shield electrode. That is, since both principal surfaces of the vibration detection electrode 50 are covered with the shield electrode 70 and the electric resistor 30 being setting to the reference potential, it is possible to reduce noise. In particular, when the electric resistor 30 close to the detection target 2 is set to the reference potential, it is possible to prevent noise from the detection target 2 and to detect a minute signal with higher accuracy.

The connection point P3 corresponding to the second input terminal of the present disclosure is connected to the vibration detection electrode 50. When vibration occurs in the piezoelectric body 40, a minute signal is input to a non-inverting input of the operational amplifier. Since the voltage follower configured by the operational amplifier OP has a very high input impedance, it is possible to output the output voltage Vout without attenuating such a minute input signal. Therefore, the sensor 1 can detect the minute vibrations occurring in the piezoelectric body 40.

If hum noise or the like is superimposed on the output voltage Vout, for example, an analog filter circuit may be connected to reduce the noise, or noise reduction processing may be performed through digital signal processing.

Figure 4A:
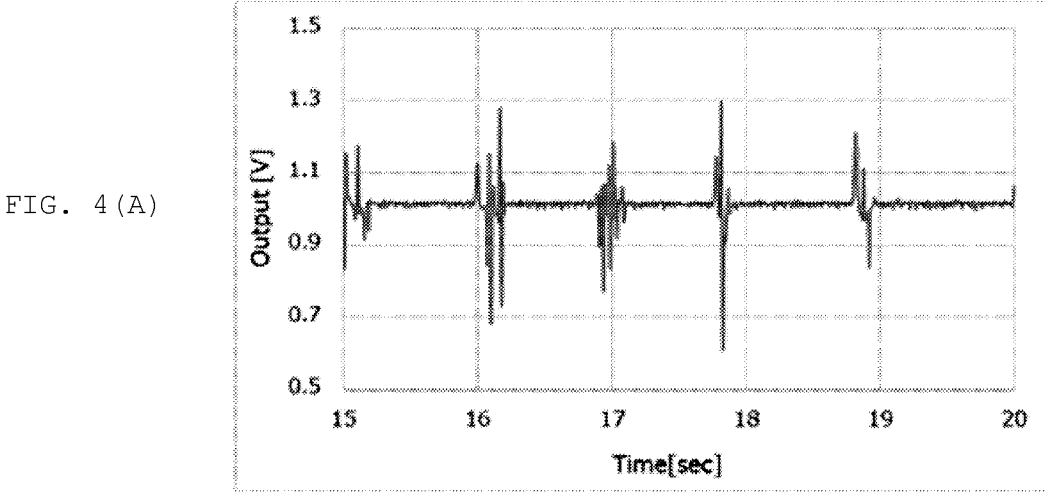
FIG. 4(A) is a diagram showing an output voltage Vout of the feedback processing circuit 91.
Figure 4B:
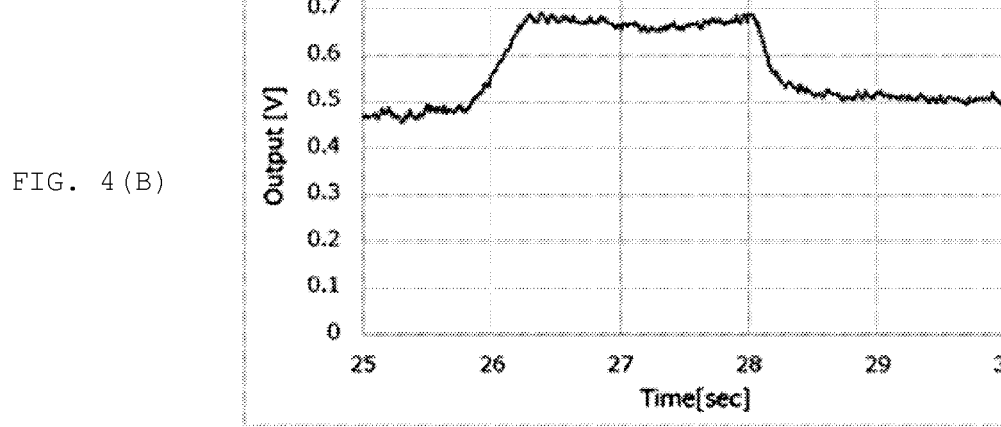
FIG. 4(B) is a diagram showing an output voltage e of the resistance voltage dividing circuit 90.

FIG. 4(A) is a diagram showing the output voltage Vout of the feedback processing circuit 91, and FIG. 4(B) is a diagram showing the output voltage e of the resistance voltage dividing circuit 90. As shown in FIG. 4(A), the output voltage Vout of the feedback processing circuit 91 has a stable voltage value of about 1 V in a state where no minute vibrations occur, whereas the output voltage Vout has a voltage fluctuation of $1\pm0.1$ V or more when minute vibrations occur. That is, the voltage can vary between 0.9 or less and/or 1.1 or more, in response to the minute vibrations as shown in FIG. 4(A). Moreover, as shown in FIG. 4(B), the output voltage e of the resistance voltage dividing circuit 90 has a voltage value of about 0.5 V in a case where no strain occurs, whereas the output voltage e has a voltage value of about 0.7 V in a case where strain occurs.

Therefore, the sensor 1 can detect both minute vibrations and static strain merely by a simple circuit configuration including the piezoelectric body, the electric resistor, the vibration detection electrode, the resistance voltage dividing circuit (e.g., a resistance circuit), and the feedback processing circuit (e.g., an operational amplifier) without using a complex circuit such as a timer or a pulse waveform for charging.

Figure 5:
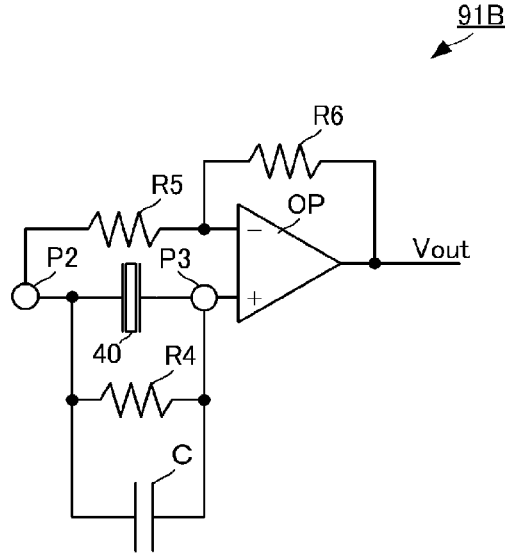
FIG. 5 is a circuit diagram showing a configuration of a feedback processing circuit 91B according to a modification.

FIG. 5 is a circuit diagram showing a configuration of a feedback processing circuit 91B according to a modification of the exemplary embodiment. In general, the same components as those in FIG. 3 are denoted by the same reference numerals, and description thereof is omitted. In particular, the feedback processing circuit 91B is a non-inverting amplifier circuit.

The connection point P2 is connected to the inverting input terminal (i.e., the reference input terminal) of the operational amplifier OP via a resistor R5. That is, the shield electrode 70 and the electric resistor 30 are connected to the reference input terminal of the non-inverting amplifier circuit. The output of the operational amplifier OP is connected to the reference input terminal via a resistor R6.

The output voltage Vout is amplified with respect to the voltage at the connection point P3 in accordance with an amplification factor determined by the ratio of the resistance values of the resistor R5 and the resistor R6. That is, the output voltage Vout is (1+R6/R5) times the voltage at the connection point P3 in this exemplary aspect.

The feedback processing circuit 91B, which is such a non-inverting amplifier circuit, can also be configured to output the output voltage Vout without attenuating a minute input signal. In addition, since the feedback processing circuit 91B amplifies the input voltage, if the resistance values of the resistor R5 and the resistor R6 are appropriately set, it is possible to appropriately detect an input signal for a further minute vibration.

Figure 6:
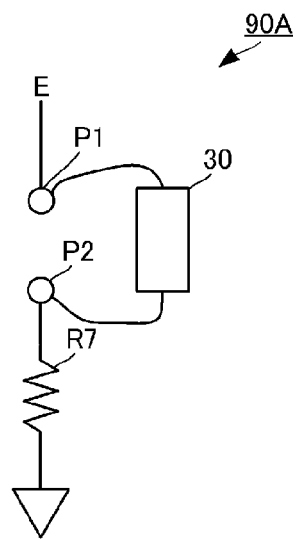
FIG. 6 is a circuit diagram showing a configuration of a resistance voltage dividing circuit 90A according to the modification.

FIG. 6 is a circuit diagram showing a configuration of a resistance voltage dividing circuit 90A according to the modification of the exemplary embodiment. It is again noted that the same components as those in FIG. 2 are denoted by the same reference numerals, and description thereof is omitted. The resistance voltage dividing circuit 90A includes a resistor R7. The connection point P1 corresponds to an input point (e.g., a first input terminal) of the resistance voltage dividing circuit 90A. The connection point P2 corresponds to a voltage dividing point of the resistance voltage dividing circuit 90A (i.e., the voltage dividing point of the resistor R7 and the electric resistor 30).

In operation, a power supply voltage E is applied to connection point P1 which is the first input terminal. Then, the resistance voltage dividing circuit 90A outputs the voltage of the connection point P2 which is the voltage dividing point as the output voltage e. Here, when the piezoelectric body 40 is strained by the deformation of the detection target 2 and strain occurs in the electric resistor 30, the resistance value of the electric resistor 30 changes. When the resistance value of the electric resistor 30 changes, the output voltage e also changes. For example, when the resistance value of the resistor R7 is R and the change in the resistance value of the electric resistor 30 is $\Delta R$, the output voltage e is expressed by $e=E/\{2+(\Delta R/R)\}$.

Thus, in the resistance voltage dividing circuit 90A shown in FIG. 6, the sensor 1 is also configured to measure the change in the resistance value of the electric resistor 30 by measuring the output voltage e. Moreover, the sensor 1 can obtain a strain by dividing the change in the resistance value by a gauge factor (e.g., a value determined by the material of the electric resistor 30).

In this way, the sensor 1 is configured to detect static strain with a simpler configuration. However, when the strain is slight and the change in the resistance value of the electric resistor 30 is minute, it is preferable to use the bridge circuit shown in FIG. 2 having higher sensitivity as the resistance voltage dividing circuit.

Figure 7:
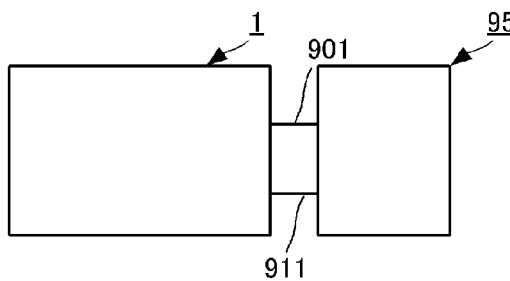
FIG. 7 is a block diagram showing a configuration of a sensor processing device including the sensor 1 and a microcomputer 95.

FIG. 7 is a block diagram showing a configuration of a sensor processing device including the sensor 1 and a microcomputer 95. An output 900 of the resistance voltage dividing circuit 90 of the sensor 1 and an output 911 of the feedback processing circuit 91 are connected to the microcomputer 95.

The microcomputer 95 corresponds to a processing unit which performs arithmetic processing, and performs arithmetic processing of the output of the feedback processing circuit 91 based on the output of the resistance voltage dividing circuit 90. In addition, the microcomputer 95 performs arithmetic processing of the output of the resistance voltage dividing circuit 90 based on the output of the feedback processing circuit 91. For example, when the sensor 1 is attached to human skin to detect pulse rate as described above, the resistance voltage dividing circuit 90 detects a large strain of the skin, and the feedback processing circuit 91 detects pulsation. Then, when the strain amount detected by the resistance voltage dividing circuit 90 exceeds a certain value, the microcomputer 95 determines that accurate pulsation cannot be acquired, and invalidates the pulsation detected by the feedback processing circuit 91. This configuration allows a sensor processing circuit to accurately detect pulse rate. For example, when the sensor 1 is attached to a soft robot hand and is used to adjust holding force, it is possible to detect the deformation and deformation amount of the robot hand by the resistance voltage dividing circuit 90. The microcomputer 95, for example, can adjust the holding force based on the deformation amount. The feedback processing circuit 91 can detect the slip of the held object due to gravity. When the slip detected by the feedback processing circuit 91 exceeds a certain value, the microcomputer 95 determines that there is a risk of the held object falling and offsets the output of the resistance voltage dividing circuit 90. The holding force of the robot hand is increased by complementing the deformation amount corresponding to the offset. Thus, a robot hand can be realized in which the risk of falling is suppressed.

In general, it is noted that the description of the exemplary embodiment is in all respects illustrative and not restrictive. For example, in the above embodiment, skin is shown as the detection target 2, and an example of detecting human pulsation and strain has been shown. However, for example, the detection target 2 may be a robot arm. In this case, the sensor 1 can detect mechanical minute vibrations and large strain.

DESCRIPTION OF REFERENCE SYMBOLS

1: Sensor
2: Detection target
5: Adhesive
30: Electric resistor
40: Piezoelectric body
50: Vibration detection electrode
60: Insulating body
70: Shield electrode
90: Resistance voltage dividing circuit
90A: Resistance voltage dividing circuit
91: Feedback processing circuit
91B: Feedback processing circuit
95: Microcomputer

The invention claimed is:
1. A sensor comprising:
a piezoelectric body;
an electric resistor disposed on a first principal surface of the piezoelectric body;
a vibration detection electrode disposed on a second principal surface of the piezoelectric body that is opposite the first principal surface;
a resistance voltage dividing circuit that has a first input terminal and a voltage dividing point; and
a feedback processing circuit that has a second input terminal, wherein the electric resistor is connected to the voltage dividing point and the first input terminal, and the vibration detection electrode is connected to the second input terminal, wherein the feedback processing circuit includes a non-inverting amplifier circuit, and wherein the electric resistor is connected to a reference input terminal of the non-inverting amplifier circuit.

2. The sensor according to claim 1, wherein the feedback processing circuit includes a voltage follower.

3. The sensor according to claim 2, wherein the voltage follower of the feedback processing circuit is an operational amplifier with an output connected to an inverting input terminal of the operational amplifier.

4. The sensor according to claim 3, wherein the operational amplifier is connected to the piezoelectric body, a resistor, and a capacitor, which are connected in parallel.

5. The sensor according to claim 1, wherein the resistance voltage dividing circuit is a bridge circuit.

6. The sensor according to claim 5, further comprising a differential amplifier circuit that is connected to the bridge circuit.

7. The sensor according to claim 1, further comprising an insulating body that has third and fourth principal surfaces that oppose each other, with the third principal surface directly facing the second principal surface of the piezoelectric body.

8. The sensor according to claim 1, wherein the electric resistor is connected to the resistance voltage dividing circuit via a wire.

9. A sensor processing device comprising:

the sensor according to claim 1; and a processing unit configured to adjust an output of the resistance voltage dividing circuit based on an output of the feedback processing circuit.

10. A sensor processing device comprising:

the sensor according to claim 1; and a processing unit configured to adjust an output of the feedback processing circuit based on an output of the resistance voltage dividing circuit.

11. A sensor comprising:

a piezoelectric body;

an electric resistor disposed on a first principal surface of the piezoelectric body;

a vibration detection electrode disposed on a second principal surface of the piezoelectric body that is opposite the first principal surface;

a resistance voltage dividing circuit that has a first input terminal and a voltage dividing point;

a feedback processing circuit that has a second input terminal;

an insulating body that has third and fourth principal surfaces that oppose each other, with the third principal surface directly facing the second principal surface of the piezoelectric body; and a shield electrode that is disposed on the fourth principal surface of the insulating body, wherein the electric resistor is connected to the voltage dividing point and the first input terminal, and the vibration detection electrode is connected to the second input terminal.

12. The sensor according to claim 11, wherein the vibration detection electrode is a solid electrode covering substantially an entire surface of the second principal surface of the piezoelectric body, and the shield electrode is a solid electrode having substantially a same area as the vibration detection electrode in a plan view and covers substantially an entire surface of the vibration detection electrode with the insulating body interposed therebetween.

13. The sensor according to claim 12, wherein the electric resistor is patterned in a meander shape in the plan view.

14. The sensor according to claim 12, wherein the shield electrode is connected to the voltage dividing point.

15. The sensor according to claim 14, wherein the feedback processing circuit is connected to the shield electrode and the electric resistor via the voltage dividing point.

16. The sensor according to claim 15, wherein the electric resistor is configured to function as a shield electrode by being electrically connected to the shield electrode.

17. A sensor comprising:

a piezoelectric body;

an electric resistor disposed on a first principal surface of the piezoelectric body;

a vibration detection electrode disposed on a second principal surface of the piezoelectric body that is opposite the first principal surface;

a resistance voltage dividing circuit that has a first input terminal and a voltage dividing point; and a feedback processing circuit that has a second input terminal, wherein the electric resistor is connected to the voltage dividing point and the first input terminal, and the vibration detection electrode is connected to the second input terminal, and wherein the feedback processing circuit includes a voltage follower that is an operational amplifier with an output connected to an inverting input terminal of the operational amplifier.

18. The sensor according to claim 17, wherein the operational amplifier is connected to the piezoelectric body, a resistor, and a capacitor, which are connected in parallel.

19. The sensor according to claim 17, wherein the resistance voltage dividing circuit is a bridge circuit.

20. The sensor according to claim 17, further comprising an insulating body that has third and fourth principal surfaces that oppose each other, with the third principal surface directly facing the second principal surface of the piezoelectric body.

* * * * *